(12) United States Patent
Negami et al.

(10) Patent No.: US 8,498,581 B2
(45) Date of Patent: Jul. 30, 2013

(54) COMMUNICATION TEST DEVICE AND COMMUNICATION TEST METHOD

(75) Inventors: Yuichi Negami, Ayase (JP); Akihide Egawa, Ebina (JP); Hiroyuki Tsuda, Ebina (JP); Tsuyoshi Sato, Atsugi (JP); Takuma Goto, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 13/589,317

(22) Filed: Aug. 20, 2012

(65) Prior Publication Data
US 2013/0005271 A1 Jan. 3, 2013

Related U.S. Application Data

(62) Division of application No. 12/520,003, filed as application No. PCT/JP2008/000185 on Feb. 8, 2008, now Pat. No. 8,311,486.

(30) Foreign Application Priority Data

Feb. 8, 2007 (JP) ................................ 2007-028724

(51) Int. Cl.
*H04B 17/00* (2006.01)
(52) U.S. Cl.
USPC ................ 455/67.11; 455/67.14; 455/67.7; 455/423
(58) Field of Classification Search
USPC .............. 455/423–425, 67.11, 67.14, 67.7, 455/414.1, 405, 115.1–115.5, 226.1, 456.1–457; 370/252
See application file for complete search history.

(56) References Cited

U.S. PATENT DOCUMENTS

| 6,970,702 B1 * | 11/2005 | Martin ........................... 455/424 |
| 7,313,402 B1 * | 12/2007 | Rahman et al. ............. 455/456.1 |
| 7,447,500 B2 * | 11/2008 | Endo et al. ...................... 455/423 |
| 2002/0123338 A1 * | 9/2002 | Iyer ................................. 455/423 |
| 2005/0227625 A1 * | 10/2005 | Diener .......................... 455/67.7 |
| 2006/0094416 A1 | 5/2006 | Endo et al. |
| 2006/0154610 A1 * | 7/2006 | Rumney ..................... 455/67.14 |

FOREIGN PATENT DOCUMENTS

| DE | 103 35 811 A1 | 3/2005 |
| JP | A 2001-326642 | 11/2001 |
| JP | A 2004-282247 | 10/2004 |
| JP | A 2005-130002 | 5/2005 |
| JP | 2007-501552 | 1/2007 |
| WO | WO 2005/018153 A1 | 2/2005 |

OTHER PUBLICATIONS

Int'l. Search Report issued in PCT/JP2008/000185, mailed Apr. 1, 2008.

* cited by examiner

*Primary Examiner* — Edward Urban
*Assistant Examiner* — Golam Sorowar
(74) *Attorney, Agent, or Firm* — Greer, Burns & Crain, Ltd.

(57) ABSTRACT

A communication test device can assist in identifying a cause of a change in throughput of a mobile communication terminal. The communication test device accumulates (a) trace data on a specific unit of data complying with a designated communication standard, and (b) throughput data on throughput of the specific unit of data transmitted to and received from a mobile communication terminal. Trace data and throughput data are extracted from the accumulation, and trace data is displayed. A graph of the variation of throughput with time is displayed on the display unit. Trace data corresponding to a time designated by an operating unit can also be displayed.

14 Claims, 12 Drawing Sheets

FIG. 10

(a)
SCENARIO NAME:
Video_test

```
Config_PHY(···);
Config_PHY(···);
  . .
Send_Message(···);
  . .
```

(b)
SCENARIO NAME:
Packet_Ratechange_test

```
Config_PHY(···);
Start_sequence("Rate_64K");
Send_Message(···);
  . .
End_sequence("Rate_64K");
  . .
Start_sequence("Rate_384K");
  . .
Config_RLC(···);
Send_Message(···);
  . .
End_sequence("Rate_384K");
```

(c)
SCENARIO NAME:
PPP_test

```
Config_RLC(···);
  . .
Send_Message(···);
  . .
Start_sequence("Frame1_send");
  . .
Start_sequence("Frame2_send");
```

COMMUNICATION TEST DEVICE AND COMMUNICATION TEST METHOD

This application is a Divisional of U.S. patent application Ser. No. 12/520,003, filed Jun. 18, 2009, which is a U.S. National Phase under 35 U.S.C. §371 of International Application No. PCT/JP2008/000185, filed Feb. 8, 2008.

TECHNICAL FIELD

The present invention relates to a communication test device and a communication test method of testing a relevant communication device by monitoring data transmitted to the communication device and data received from the communication device.

BACKGROUND ART

A conventional communication test device establishes a connection with each access point by performing a connection-oriented procedure, and measures and count the amount of data for each connection of the relevant access point (see for example patent document 1). More specifically, the conventional communication test device measures the mean of throughput for each access point at hourly intervals, and displays a polygonal line graph of the mean of throughput for each access point measured at hourly intervals.
Patent document 1: Japanese Patent Laid-Open Publication 2001-326642 (page 5, FIG. 5)

DISCLOSURE OF THE INVENTION

Problems to be Solved by the Invention

The above-mentioned polygonal line graph has a horizontal axis with a time scale and a vertical axis with a throughput scale. Even if the mean of throughput has been rapidly changed (decreased or increased) with time, the user cannot identify a cause of the rapid change of the mean of throughput from the polygonal line graph displayed on a screen.

It is therefore an object of the present invention to provide a communication test device which can assist in identifying a cause of the change in throughput of the mobile communication terminal under test.

Means for Solving the Problems

The communication test device according to the present invention, comprising: a base station unit for performing wireless communication with a mobile communication terminal under test on the basis of a designated communication standard; accumulating means for accumulating trace data regarding a specific unit of data to be exchanged between the mobile communication terminal and the base station unit and throughput data regarding throughput for the specific unit of data in association with time information indicative of the time of sending and receiving the specific unit of data; extracting means for extracting the trace data and the throughput data from the accumulating means; a display unit on which the trace data extracted by the extracting means are displayed by trace display means, and a graph showing the variation with time of throughput based the throughput data extracted by the extracting means is displayed by throughput display means; and time obtaining means for obtaining a time corresponding to at least one point selected for a designated analysis from the graph, wherein the extracting means extracts, from the accumulating means, the trace data corresponding to the time obtained by the time obtaining means, and the trace display means displays the trace data corresponding to the time obtained by the time obtaining means on the display unit in a way that the trace data corresponding to the time obtained by the time obtaining means is distinguished from other trace data on the display unit.

The communication test device thus constructed as previously mentioned can assist in identifying a cause of the change in throughput of the mobile communication terminal under test, by reason that, when a user designates a time on the basis of the variation with time of throughput displayed on the display unit, the extracting means extracts the trace data corresponding to the designated time, the trace display means displays the trace data corresponding to the time obtained by the time obtaining means on the display unit in a way that the trace data corresponding to the time obtained by the time obtaining means is distinguished from other trace data on the display unit.

In the communication test device according to the present invention, the trace display means may display trace data on the display unit with detail information on the relevant trace data.

The communication test device thus constructed as previously mentioned can assist in identifying a cause of the change in throughput of the mobile communication terminal, by reason that the trace display means may display trace data on the display unit with detail information on the relevant trace data.

The communication test device according to the present invention comprises: a scenario storage unit having a plurality of scenarios defining communication procedures for wireless communication with a mobile communication terminal under test, the scenarios having test term names for identifying tests to be executed on the basis of the communication procedures; a base station unit for performing wireless communication with the mobile communication terminal on the basis of a scenario stored in the scenario storage unit, and extracting a test term name from the relevant scenario; accumulating means for accumulating a test term name of a test to be executed between the base station unit and the mobile communication terminal on the basis of the scenario in association with time information indicative of the time of starting the test, and accumulating throughput data regarding throughput for a specific unit of data to be exchanged between the mobile communication terminal and the base station unit on the basis of the scenario in association with the time information; extracting means for extracting the test term name and the throughput data from the accumulating means; a display unit on which the test term name extracted by the extracting means are displayed by test term name display means, and a graph showing the variation with time of throughput based the throughput data extracted by the extracting means is displayed by throughput display means; and time obtaining means for obtaining a time corresponding to at least one point selected for a designated analysis from the graph, wherein the extracting means extracts, from the accumulating means, a test term name of a test executed at the time obtained by the time obtaining means, and the trace display means displays the test term name of the test executed at the time obtained by the time obtaining means on the display unit in a way that the test term name of the test executed at the time obtained by the time obtaining means is distinguished from other test term name on the display unit.

The communication test device thus constructed as previously mentioned can assist in identifying a cause of the change in throughput of the mobile communication terminal under test, and can identify the relation of the executed test to the throughput of the mobile communication terminal under test, by reason that, when a user designates a time on the basis of the variation with time of throughput displayed on the display unit, the extracting means extracts the trace data corresponding to the designated time, the trace display means displays the extracted trace data on the display unit in a way that the trace data corresponding to the time obtained by the time obtaining means is distinguished from other trace data on the display unit.

In the communication test device according to the present invention, the throughput display means may scroll a graph showing the variation with time of throughput based the throughput data extracted by the extracting means, and stop scrolling the graph when the time obtaining means obtains a time designated by the operating unit.

The communication test device thus constructed as previously mentioned can assist in checking the graph without fail, by reason that the throughput display means scrolls a graph showing the variation with time of throughput based the throughput data extracted by the extracting means, and stops scrolling the graph when the time obtaining means obtains a time designated by the operating unit.

In the communication test device according to the present invention, the time obtaining means may obtain two or more times designated by the operating unit on the basis of the variation with time of throughput displayed on the display unit, the extracting means may extract, from the accumulating means, the trace data corresponding to the times obtained by the time obtaining means, and the trace display means may display trace data associated with the closest times to the times obtained by the time obtaining means on the display unit in a way that trace data associated with the closest times to the times obtained by the time obtaining means are distinguished from other trace data on the display unit.

The communication test device thus constructed as previously mentioned can assist in identifying a cause of the change in throughput of the mobile communication terminal under test, by reason that the trace display means displays the trace data on the display unit in a way that trace data associated with the closest times to the times obtained by the time obtaining means are distinguished from other trace data.

In the communication test device according to the present invention, the throughput display means may display, on the display unit, a graph showing the variation with time of throughput based the throughput data extracted by the extracting means, and the graph may further show at least one of an uplink communication band and a downlink communication band decided on the basis of the negotiation with the mobile communication terminal.

The communication test device thus constructed as previously mentioned can assist in identifying a cause of the change in throughput of the mobile communication terminal under test, by reason that the graph further shows at least one of an uplink communication band and a downlink communication band decided on the basis of the negotiation with the mobile communication terminal.

In the communication test device according to the present invention, the specific unit of data received from the mobile communication terminal may have an index value indicative of the quality in state of the wireless communication with the mobile communication terminal, and the graph may further show the index value extracted from the specific unit of data received just before the time obtained by the time obtaining means.

The communication test device thus constructed as previously mentioned can assist in checking the variation with time of throughput in comparison with the quality in state of the wireless communication, by reason that the graph further shows the index value extracted from the specific unit of data received just before the time obtained by the time obtaining means.

In the communication test device according to the present invention, the throughput display means may display a graph showing individually the variation with time of throughput based on the designated communication standard and the variation with time of throughput based on other communication standard in response to the variation of the wireless communication based on the designated communication standard to the wireless communication based on other communication standard.

The communication test device thus constructed as previously mentioned can assist in checking the variation with time of throughput at the time of changing from the wireless communication based on the designated communication standard to the wireless communication based on other communication standard, by reason that the throughput display means displays a graph showing individually the variation with time of throughput based on the designated communication standard and the variation with time of throughput based on other communication standard.

In the communication test device according to the present invention, the throughput display means displays a graph showing the variation with time of throughput based the throughput data extracted by the extracting means in a way that the throughput smaller than a predetermined threshold value is distinguished from other throughput on the display unit.

The communication test device thus constructed as previously mentioned can inform the user that the throughput is equal to or smaller than a predetermined threshold value, by reason that the throughput display means displays a graph showing the variation with time of throughput in a way that the throughput smaller than a predetermined threshold value is distinguished from other throughput on the display unit.

In the communication test device according to the present invention, when a protocol corresponding to a designated layer to be used on the basis of the designated communication standard is selected by the operating unit, the throughput display means displays a graph showing the variation with time of throughput on the basis of the protocol of the designated layer.

The communication test device thus constructed as previously mentioned can assist in checking the variation with time of throughput on the basis of the protocol of the designated layer, by reason that the throughput display means displays a graph showing the variation with time of throughput on the basis of the protocol of the designated layer.

The communication test device according to the present invention may further comprise: a scenario storage unit having a plurality of scenarios defining communication procedures for wireless communication with the mobile communication terminal, wherein the scenarios have test term names needed for the identification of tests based on the communication procedures, the base station unit performs wireless communication with the mobile communication terminal on the basis of the scenarios stored in the scenario storage unit, and extracts a test term name from the relevant scenario, the accumulating means accumulates the test term name with time information indicative of the start time of the test, and the extracting means extracts the test term name from the accumulating means, and may further comprise: test term name display means for displaying the test term name extracted by the extracting means on the display unit, wherein the extracting means extracts, from the accumulating means, a test term name of a test executed at the time obtained by the time obtaining means, and the test term name display means displays, on the display unit, the test term name of the test executed at the time obtained by the time obtaining means in a way that the test term name of the test executed at the time obtained by the time obtaining means is distinguished from other test term names on the display unit.

The communication test device thus constructed as previously mentioned can assist in identifying a cause of the change in throughput of the mobile communication terminal under test, and can identify the relation of the executed test to the throughput of the mobile communication terminal under test, by reason that, when the user selectively designates times displayed on the display unit, the extracting means extracts trace data corresponding to the designated time, the trace display means displays trace data corresponding to the designated time on the display unit in a way that trace data corresponding to the designated time is distinguished from other trace data on the display unit, the extracting means further extracts a test term name of a test executed at the designated time, the test term name display means displays the extracted test term name on the display unit in a way that the extracted test term name is distinguished from other test term names on the display unit.

Advantageous Effect of Invention

The present invention is to provide communication test device and communication test method which can assist in identifying a cause of the change in throughput of a mobile communication terminal.

BRIEF DESCRIPTION OF DRAWINGS

FIG. 10 is views schematically showing respective parts of scenarios "Voice_test", "Packet_Ratechange_test", and "PPP_test" as an example of scenarios stored in the scenario storage unit.

EXPLANATION OF THE REFERENCE NUMERALS

Figure 1:
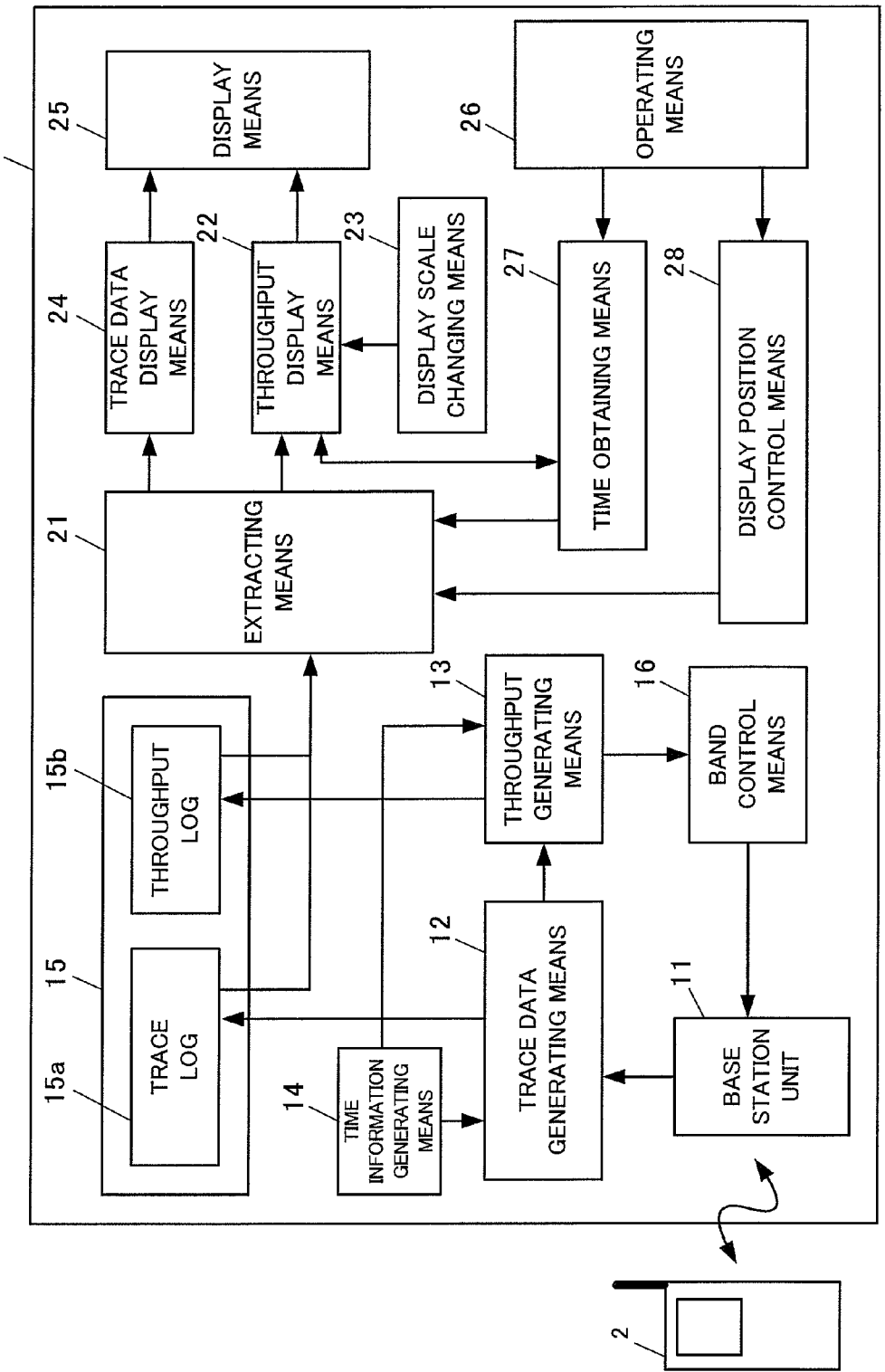
FIG. 1 is a block diagram showing a communication test device according to the embodiment of the present invention, which associates and displays throughput data with trace data.

1: communication test device
2: mobile communication terminal
3: graph
4, 6: display area
5: marker
7: maximum bandwidth of up bearer
8: maximum bandwidth of down bearer
11: base station unit
12: trace data information generating means
13: throughput calculating means
14: time information generating means
15: accumulating means
16: band control means
21: extracting means
22: throughput display means
23: display scale changing means
24: trace display means
25: display unit
26: operating unit
27: time obtaining means
28: display position control means
29: scenario storage unit
30: test item name display means
31: display area

DETAILED DESCRIPTION OF THE INVENTION

An embodiment of a communication test device for associating and displaying throughput with trace data will be described hereinafter with reference to accompanying drawings. FIG. 1 is a block diagram showing the communication test device according to the embodiment of the present invention.

The communication test device 1 shown in FIG. 1 is adapted to function as a base station of a mobile communication system, and to test a mobile communication terminal 2 by performing communication with the mobile communication terminal 2 on the basis of a designated communication standard. The communication test device 1 has, for example, a function to measure throughput of a specific unit of data transmitted and received from the mobile communication terminal 2 in format and unit based on the communication standard.

The communication test device 1 comprises a base station unit 11, trace data information generating means 12, throughput calculating means 13, time information generating means 14, accumulating means 15, band control means 16, extracting means 21, throughput display means 22, display scale changing means 23, trace display means 24, a display unit 25, an operating unit 26, time obtaining means 27, and display position control means 28.

The communication test device 1 is constituted by a central processing unit (CPU), memory media and the like. The memory media is constituted by random access memory (RAM), read only memory (ROM), hard disc drive, and the like. The CPU functions as part of the above-mentioned means by executing program modules. Additionally, the above-mentioned means may be constituted by electronic circuits in place of program modules to be executed by the CPU.

The base station unit 11 is adapted to simulate and function as a base station of a mobile communication system, and to perform, on the basis of designated communication standard, wireless communication with the mobile communication terminal 2.

For example, the wideband code division multiple access (W-CDMA), the global system for mobile (GSM) or the like is employed as the designated communication standard. Further, the high speed downlink packet access (HSDPA) defined by the 3rd generation partnership Project (3GPP) as high-speed packet communication standard derived from the wideband code division multiple access (W-CDMA), or the like may be employed as the designated communication standard.

The trace data information generating means 12 is adapted to obtain, from the base station unit 11, specific units of data transmitted to the mobile communication terminal 2 and specific units of data received from the mobile communication terminal 2, to extract, from the specific units of data received from the base station unit 11, information on event number, state of sequence in each layer, primitive parameters, message, time and like, to generate trace data from the extracted information and time information, and to output the trace data to the accumulating means 15. Further the trace data information generating means 12 is adapted to output, to the throughput calculating means 13, specific units of data transmitted to the mobile communication terminal 2 and specific units of data received from the mobile communication terminal 2.

The throughput calculating means 13 is adapted to calculate throughput per channel and session, and per unit of time, to generate throughput data from the calculated throughput and time information, and to output the throughput data to the accumulating means 15. Further, the throughput calculating means 13 is adapted to output the throughput data to the band control means 16. Here, the channel and session include logical channel, transport channel, physical channel, network service access point identifier (NSAPI), and the like.

Here, the term "throughput" is intended to indicate an effective speed of data other than overhead in each layer unless the user specifically designates the throughput.

The time information generating means 14 is adapted to output time information to the trace data information generating means 12 and the throughput calculating means 13 at regular intervals.

The accumulating means 15 is adapted to accumulate, as trace log 15*a* in a storage medium, trace data outputted from the trace data information generating means 12, and adapted to accumulate, as throughput log 15*b* in the storage medium, throughput data outputted from the throughput calculating means 13.

The band control means 16 is adapted to control communication band for communication with the mobile communication terminal 2 by negotiating (and setting) the communication band with the mobile communication terminal 2 on the basis of the throughput data outputted from the throughput calculating means 13 and procedure based on the communication standard.

The extracting means 21 is adapted to extract throughput data from the accumulating means 15, and adapted to output the extracted throughput to the throughput display means 22. Further, the extracting means 21 is adapted to extract trace data from the accumulating means 15, and adapted to output the extracted trace data to the trace display means 24.

Figure 9:
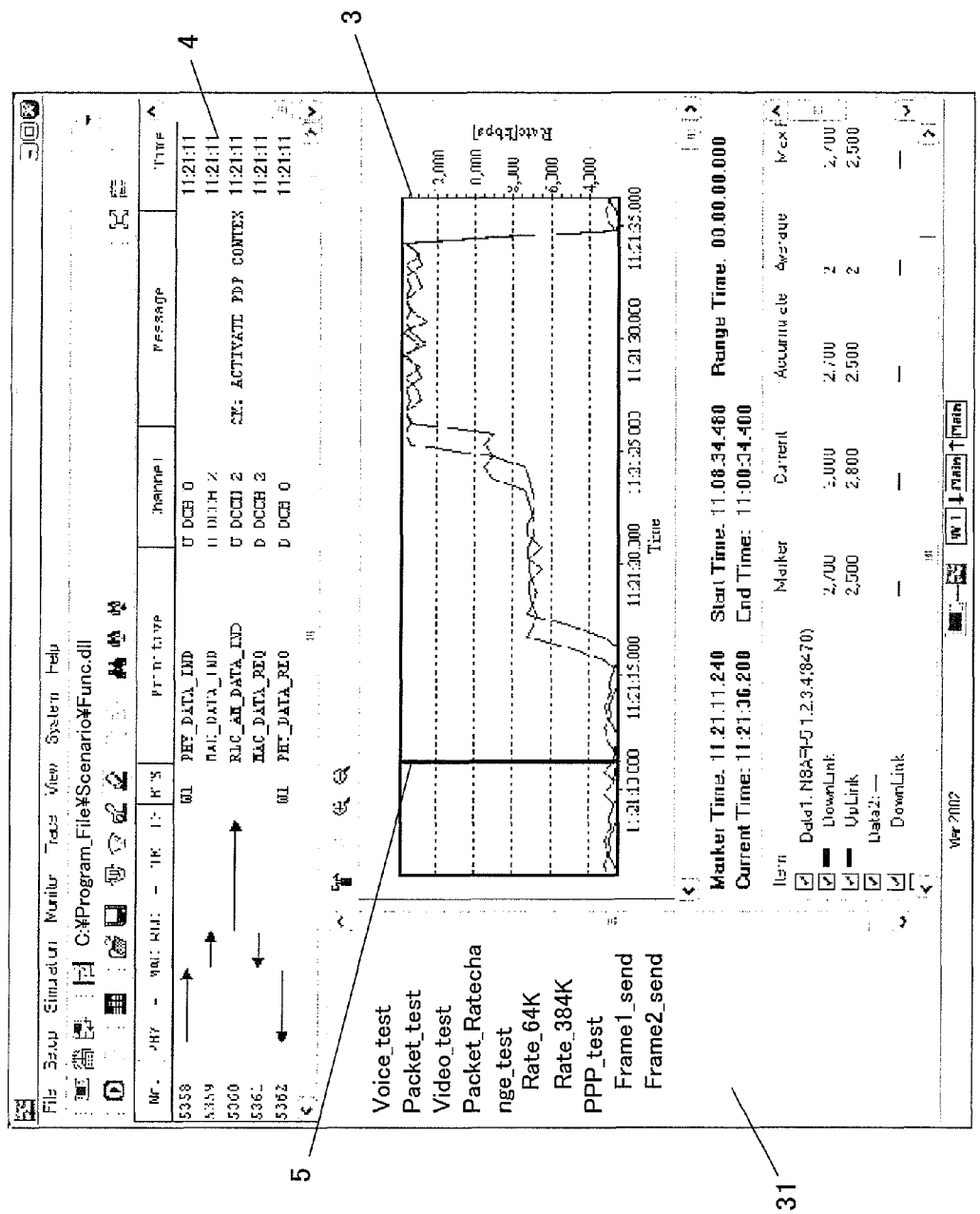
FIG. 9 is an image displayed on the display unit in the form of a window, the image having various kinds of data.

The throughput display means 22 is adapted to display, on the display unit 25, a graph 3 showing the variation with time of throughput based the throughput data extracted by the extracting means 21. For example, the graph 3 in FIG. 9 shows the variation with time of throughput displayed on the display unit 25.

Figure 2:
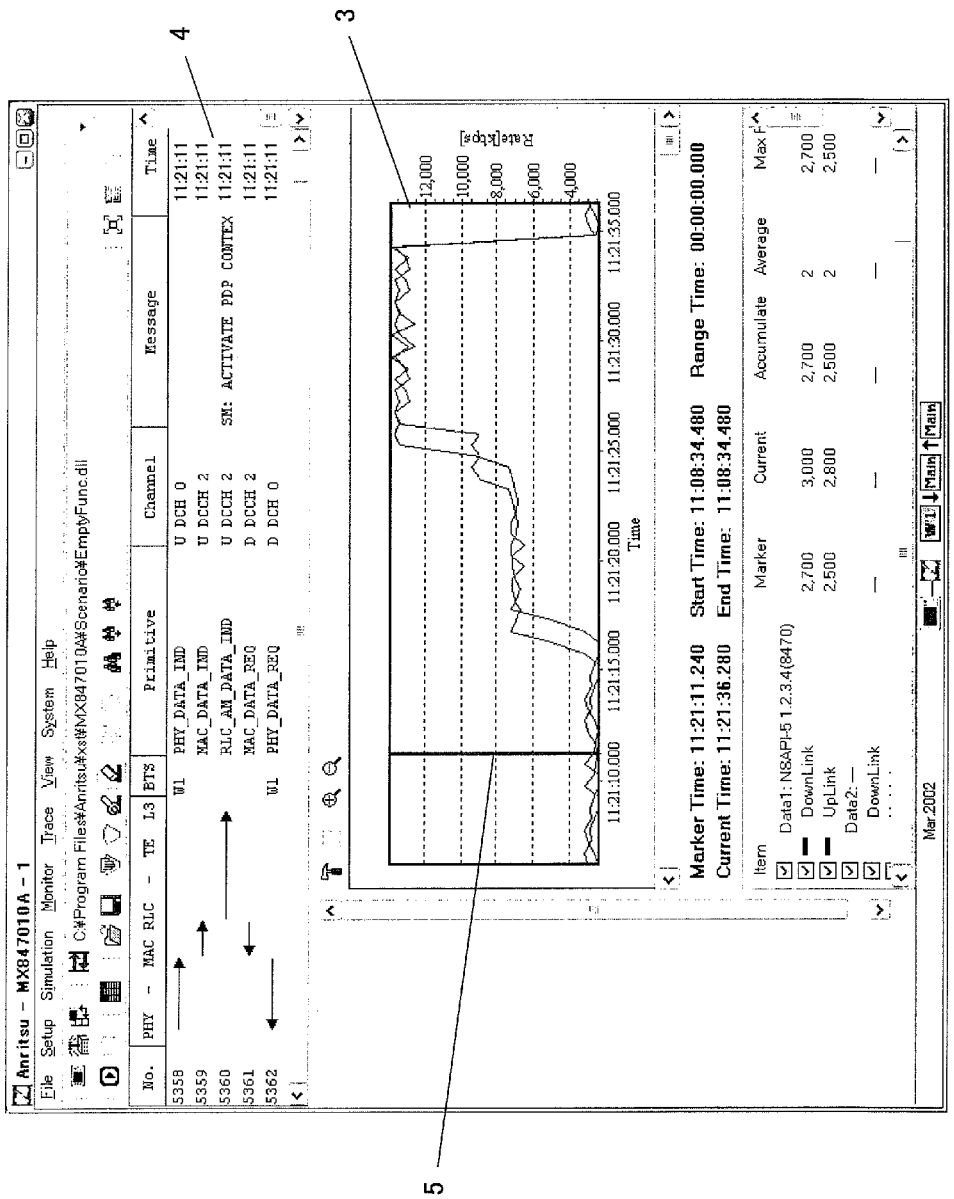
FIG. 2 is an image of various kinds of data displayed in window form on a display unit of the communication test device according to the embodiment of the present invention.

FIG. 2 is an image to be displayed on the display unit 25 in the form of a window, the image having various kinds of data. The graph 3 has a horizontal axis defined as a time axis and a vertical axis defined as a throughput axis, and shows the variation with time of throughput[kbit/sec].

In response to an input from the user on update intervals of the graph 3, the display scale changing means 23 is adapted to instruct the throughput display means 22 to update the graph 3 at intervals designated by the user. Additionally, the throughput display means 22 may be adapted to scroll the variation with time of throughput at intervals to display a graph 3 showing the latest variation with time of throughput.

The trace display means 24 is adapted to update the trace data displayed on the display unit 25 to the latest trace data extracted by the extracting means 21. For example, FIG. 2 is an image to be displayed on the display unit 25, the image having a graph 3 showing trace data. The image has a display area 4 having information corresponding to event numbers, a state of sequence in each layer, primitive parameters, message, time and like.

The display unit 25 is constituted by a liquid crystal display or the like. An image shown in FIG. 2 is displayed on the display unit 25. The operating unit 26 is constituted by a plurality of operation buttons and the like, the user inputs information by using the operating unit 26.

When the user designates a time for identifying detail information on the basis of the variation with time of throughput displayed on the display unit 25 by using the operating unit 26, the time obtaining means 27 is adapted to obtain the time designated by the user, and adapted to output the time to the extracting means 21.

When, for example, the user scrolls the graph 3 shown in FIG. 2 or/and moves a scroll bar of the display area 4 by using the operating unit 26, the display position control means 28 is adapted to have the extracting means 21 extract throughput data and trace data in response to an action of the scroll bar.

The extracting means 21 is adapted to extract throughput data and trace data from the accumulating means 15 in response to an action of the scroll bar, and adapted to output the extracted throughput data and trace data to the throughput display means 22 and the trace display means 24. On the other hand, the throughput display means 22 and the trace display means 24 are adapted to display the throughput and the trace data on the display unit 25.

The extracting means 21 is adapted to extract, from the accumulating means 15, trace data corresponding to the time obtained by the time obtaining means 27, and adapted to output the extracted trace data to the trace display means 24. On the other hand, the trace display means 24 is adapted to display the trace data on the display unit 25.

The operation of the communication test device according to the present invention will then be described hereinafter with reference to accompanying drawings.

First Embodiment

In order to check details of the graph 3 displayed on the display unit 25, the user moves a marker 5 to a point on the graph 3 displayed on the display unit 25 by using the operating unit 26. The time obtaining means 27 obtains a time corresponding to the point designated by the marker 5, and outputs the time to the extracting means 21. Here, the user may designate a time by inputting a value indicative of the time through the operating unit 26 without using the marker 5.

Then, the extracting means 21 extracts, from the accumulating means 15, trace data corresponding to the time received from the time obtaining means 27. Here, the extracting means 21 may extract trace data corresponding to the closest time to the time received from the time obtaining means 27, or the trace data corresponding to a time immediately preceding the time received from the time obtaining means 27.

The extracting means 21 outputs the extracted trace data to the trace display means 24, while the trace display means 24 displays the trace data received from the extracting means 21 on the display unit 25 in a way that the trace data received from the extracting means 21 is distinguished from other trace data on the display unit 25. When, for example, the trace data extracted by the extracting means 21 is not in a given period of time defined as a display area 4, the trace display means 24 may display the trace data extracted by the extracting means 21 in the display area 4. The trace display means 24 may highlight the trace data extracted by the extracting means 21.

Second Embodiment

Figure 3:
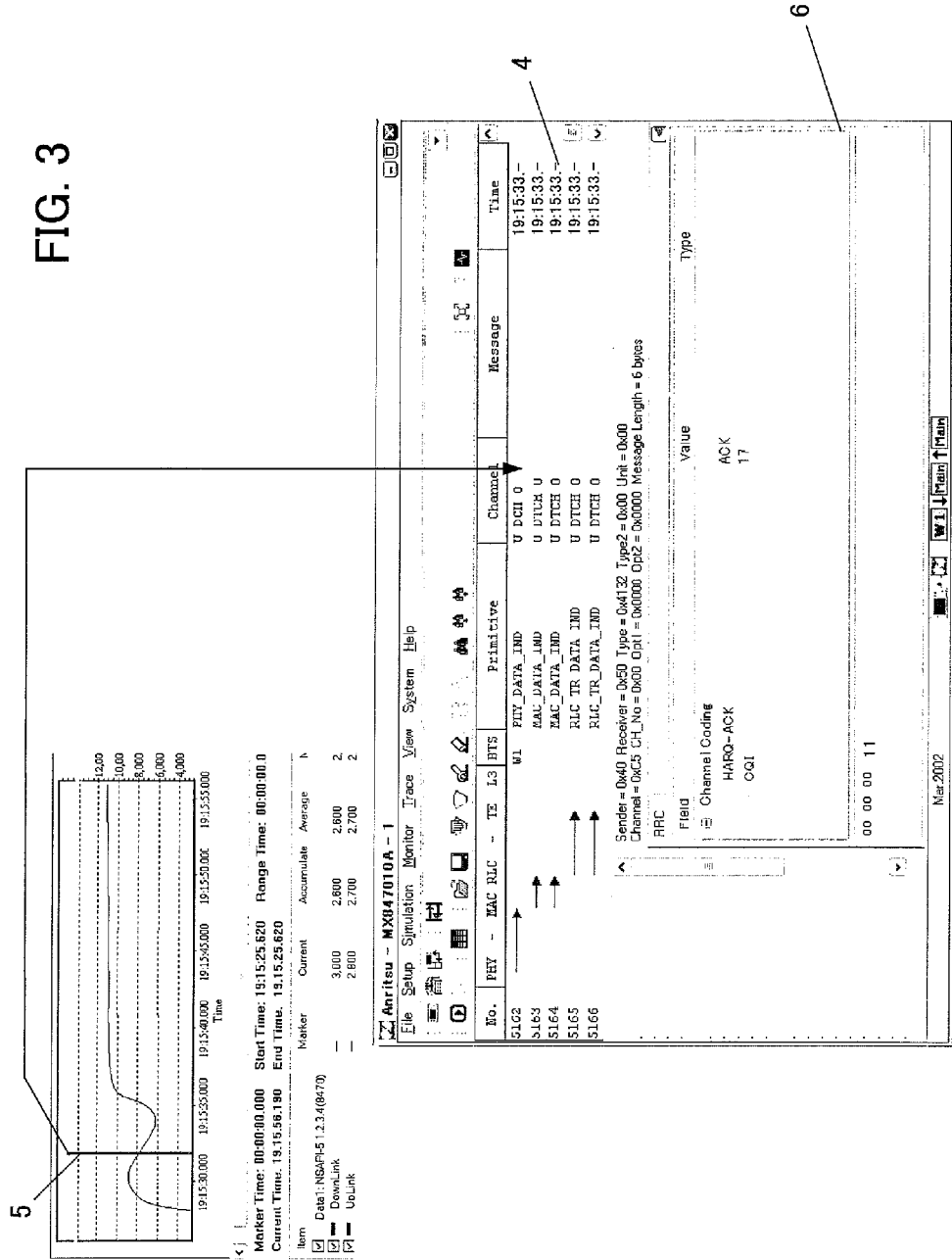
FIG. 3 is an image of detail information regarding trace data.

FIG. 3 similar to FIG. 2 is an image displayed on the display unit 25 in the form of a window, the image having various kinds of data. As shown in FIG. 3, the trace display means 24 displays the trace data extracted by the extracting means 21 on the display area 4, and displays detail information of the relevant trace data on the display area 6. The detail information such as for example a message decoded from the relevant trace data, primitive parameters and the like is displayed in the display area 6.

Third Embodiment

The throughput display means 22 may scroll a graph showing the variation with time of throughput, and stop scrolling the graph when the time obtaining means 27 obtains a time designated by the user.

Fourth Embodiment

When the user moves two or more markers 5 to points on the graph 3 displayed on the display unit 25 by using the operating unit 26, the time obtaining means 27 may obtain times corresponding to the points designated by the user. The extracting means 21 may extract, from the accumulating means 15, trace data corresponding to the respective times obtained by the time obtaining means 27. The trace data display means 24 may display the trace data extracted by the extracting means 21 on the display area 4.

When, for example, two or more times are distant from each other, the trace display means 24 cannot display the trace data corresponding to the times in the display area 4 at the same time. In this case, the trace display means 24 highlights the trace data corresponding to the times. More specifically, when the user scroll the trace data to ensure that the trace data corresponding to the designated time falls into the display area 4, the trace display means 24 may highlight the trace data corresponding to the designated time. The user may designate a period of time by dragging the marker 5.

Fifth Embodiment

Figure 4:
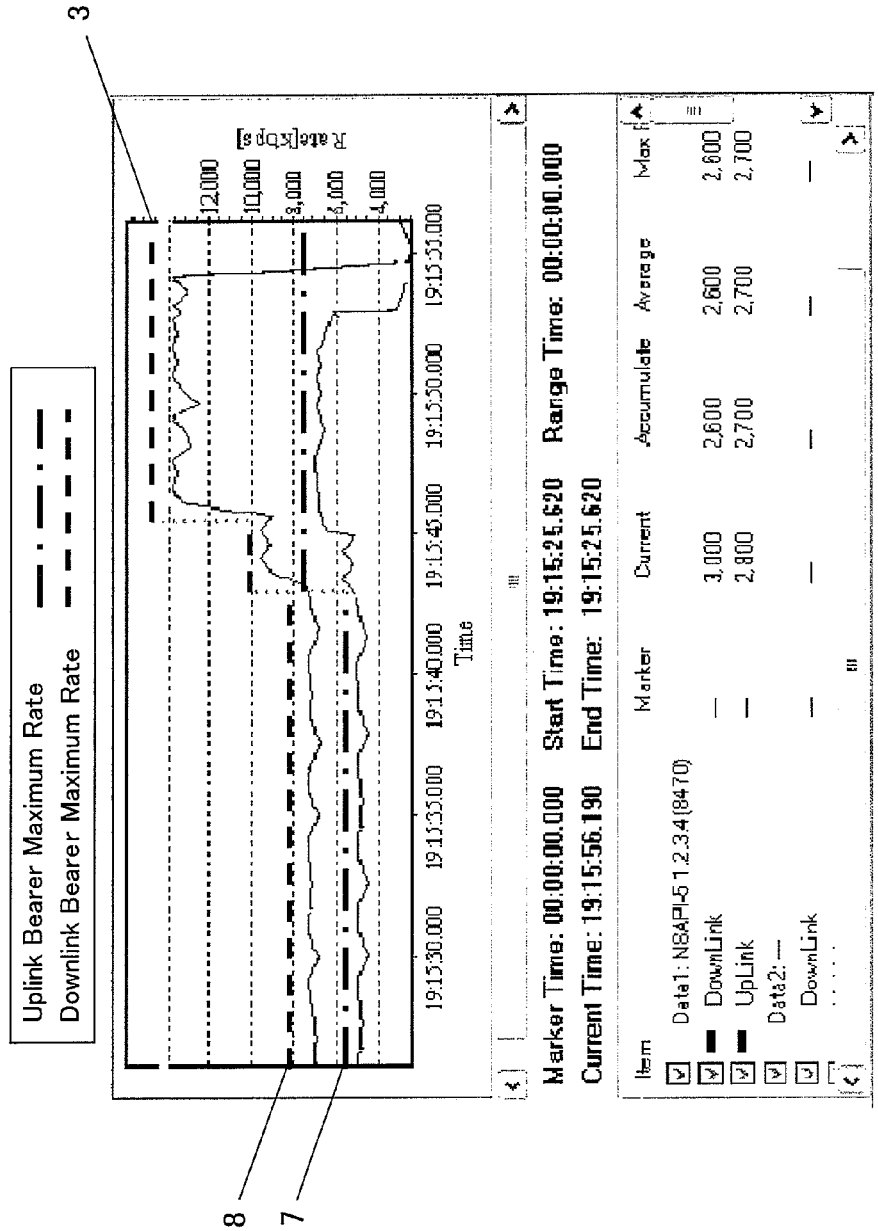
FIG. 4 is an image displayed on the display unit, the image including an uplink communication band and a downlink communication band decided on the basis of the negotiation with the mobile communication terminal.

The throughput display means 22 may display, on the display unit, a graph showing the variation with time of throughput based the throughput data extracted by the extracting means 21. The graph may indicate at least one of an uplink communication band or a downlink communication band decided on the basis of the negotiation with the mobile communication terminal 2. As shown in, for example, FIG. 4, the graph displayed by the throughput display means 22 may further indicate an uplink bearer maximum rate 7 and a downlink bearer maximum rate 8. Here, the term "uplink bearer maximum rate" is intended to indicate a maximum rate of the uplink communication band allocated to the mobile communication terminal 2, and the term "downlink bearer maximum rate" is intended to indicate a maximum rate of the downlink communication band allocated to the mobile communication terminal 2. Even if the base station unit is performing wireless communication with the mobile communication terminal 2, the communication test device can change the communication band in stages as shown in FIG. 4.

Sixth Embodiment

Figure 5:
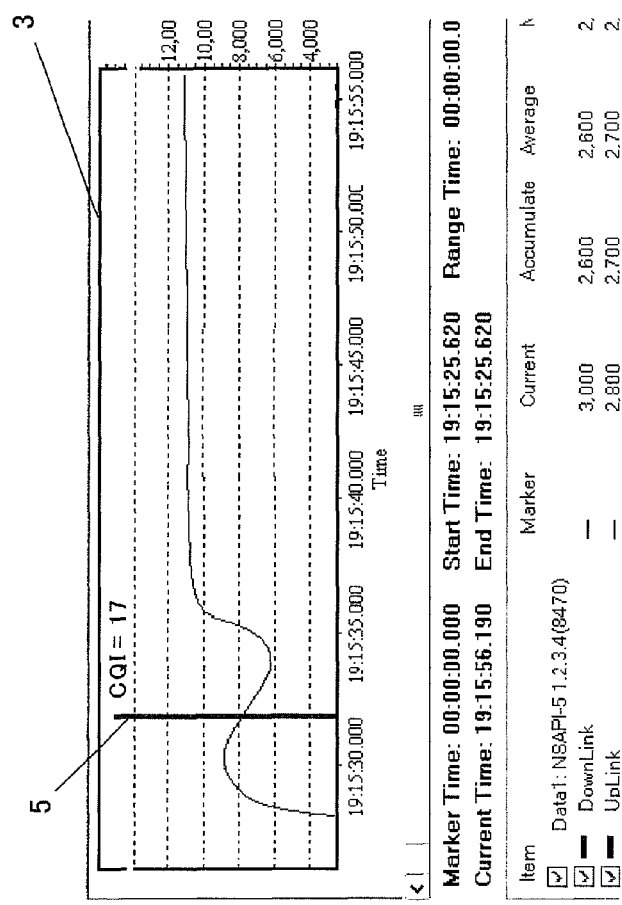
FIG. 5 is part of an image displayed on a display unit, the image including a graph showing the variation with time of throughput with CQI value.

As shown in FIG. 5, the throughput display means 22 may display a graph having a CQI value corresponding to a time immediately preceding the time obtained by the time obtaining means 21. More specifically, the time obtaining means 27 obtains a time corresponding to a point occupied by the marker 5. The extracting means 21 extracts, from the trace data, a CQI value corresponding to a time immediately preceding the time obtained by the time obtaining means 21, and displays a graph having the extracted CQI value.

Here, the term "CQI value" is intended to indicate an index value indicative of the quality in state of the wireless communication. The trace data having the CQI value has a primitive name "PHY-Data-IND" defined in the specification "3GPP TS25. 302/10. 1. 4". The CQI value has a data section defined in the specification "3GPP TS25. 212/4. 7. 1".

Seventh Embodiment

Figure 6:
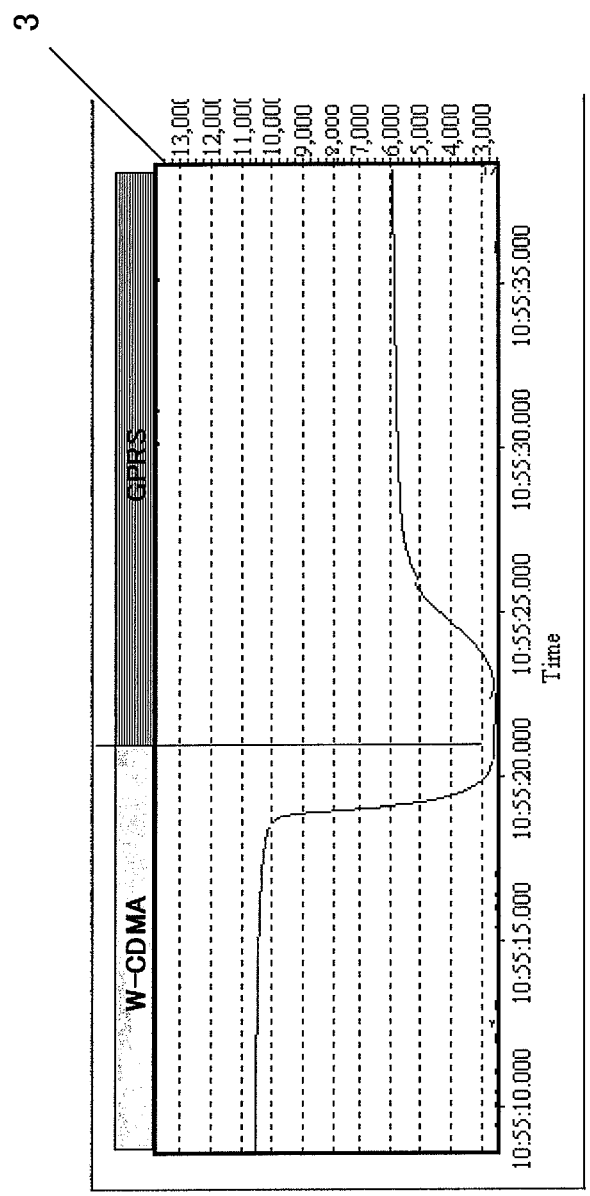
FIG. 6 is part of an image including a graph showing the variation with time of throughput corresponding to the time of changing from the designated protocol to other protocol.

When the user changes the communication standard "W-CDMA" for the wireless communication with the mobile communication terminal 2 to a communication standard "GPRS", the throughput display means 22 may display the throughput corresponding to the communication standard "W-CDMA" and the throughput corresponding to the communication standard "GPRS" on a graph 3 on the basis of the throughput data extracted by the extracting means 21 in a way that the communication standard "W-CDMA" is distinguished from the throughput corresponding to the communication standard "GPRS" as shown in FIG. 6.

Eighth Embodiment

Figure 7:
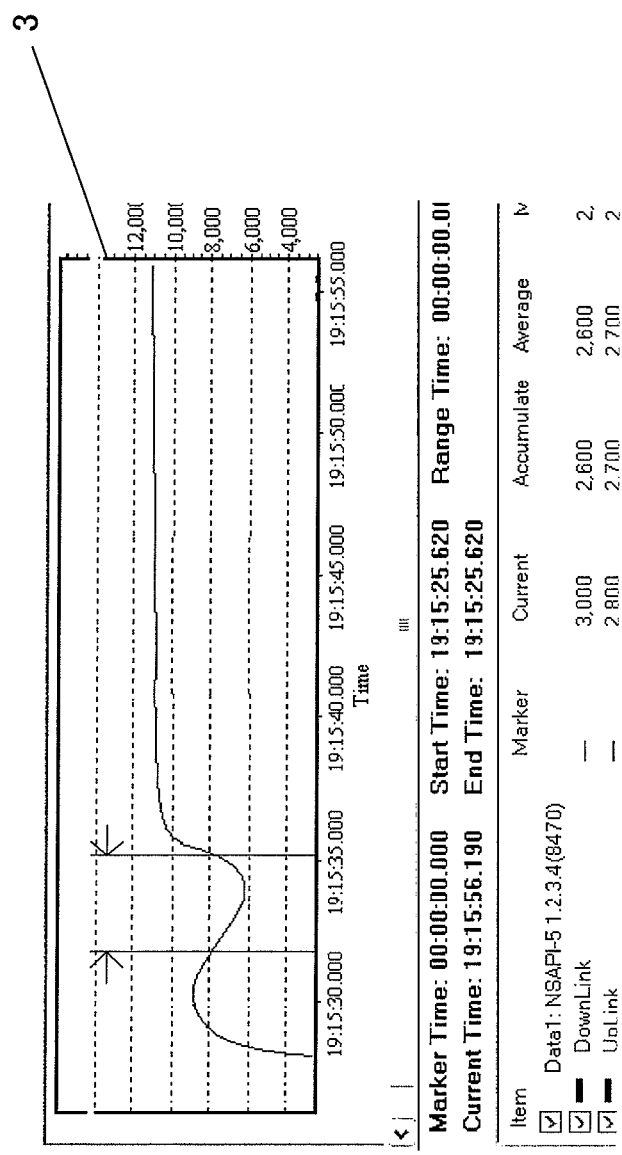
FIG. 7 is part of an image including a graph showing the variation with time of throughput at the time of identifying throughput smaller than or equal to a designated value over an identified period of time.

The throughput display means 22 is adapted to display a graph showing the variation with time of throughput based the throughput data extracted by the extracting means 21 in a way that the throughput smaller than a predetermined threshold value is identified and distinguished from other throughput on the display unit 25. As shown in FIG. 7, as a threshold level for informing the user of the reduced through, the user may input 8000 by using the operating unit 26. When the throughput smaller than or equal to 8000, the throughput display means 22 displays the reduced throughput in a way that an area corresponding to the throughput smaller than or equal to 8000 is distinguished from the remaining area on the graph 3.

Ninth Embodiment

When the user checks throughput corresponding to a designated layer, for example, throughput based on a protocol corresponding to a layer 1 (physical layer) used by, for example, HSDPA, the user selects a layer 1 by using the operating unit 26, the throughput display means 22 may display throughput based on a protocol corresponding to a layer 1. Needless to say, the throughput corresponding to a layer different from the layer 1 is displayed as a target.

When the throughput corresponding to a layer 3 (network layer) is changed to the throughput based on a protocol corresponding to a lower layer such as for example layer 1 (physical layer) and layer 2 (data link layer), the throughput display means 22 outputs, to the accumulating means 15, throughput data generated from the throughput based on a protocol corresponding to a lower layer and time information. The throughput display means 22 displays the throughput based on a protocol corresponding to a lower layer on the display unit 25 in a way that the throughput based on a protocol corresponding to a lower layer is distinguished from other trace data on the display unit 25. As a result, the user can identify retransmission based on a protocol corresponding to a lower layer by checking the throughput based on a protocol corresponding to a lower layer.

Tenth Embodiment

The graph 3 to be displayed on the display unit 25 by the throughput display means 22 may be constituted by two or more divided sections. One of the divided sections is different in time scale from the remaining sections, and can be compared with the remaining sections. Further, the throughput display means 22 may be adapted to zoom in or zoom out the graph 3 displayed on the display unit 25 if necessary.

From the foregoing description, it will be understood that the communication test device according to the tenth embodiment of the present invention can assist in identifying a cause of the change in throughput of the mobile communication terminal under test, by reason that, when the user designates a time on the basis of the variation with time of throughput displayed on the display unit 25, the extracting means 21 extracts trace data corresponding to the designated time, the trace display means 24 displays the trace data on the display unit 25 in a way that the trace data corresponding to the designated time is identified and distinguished from other trace data on the display unit 25.

Figure 11:
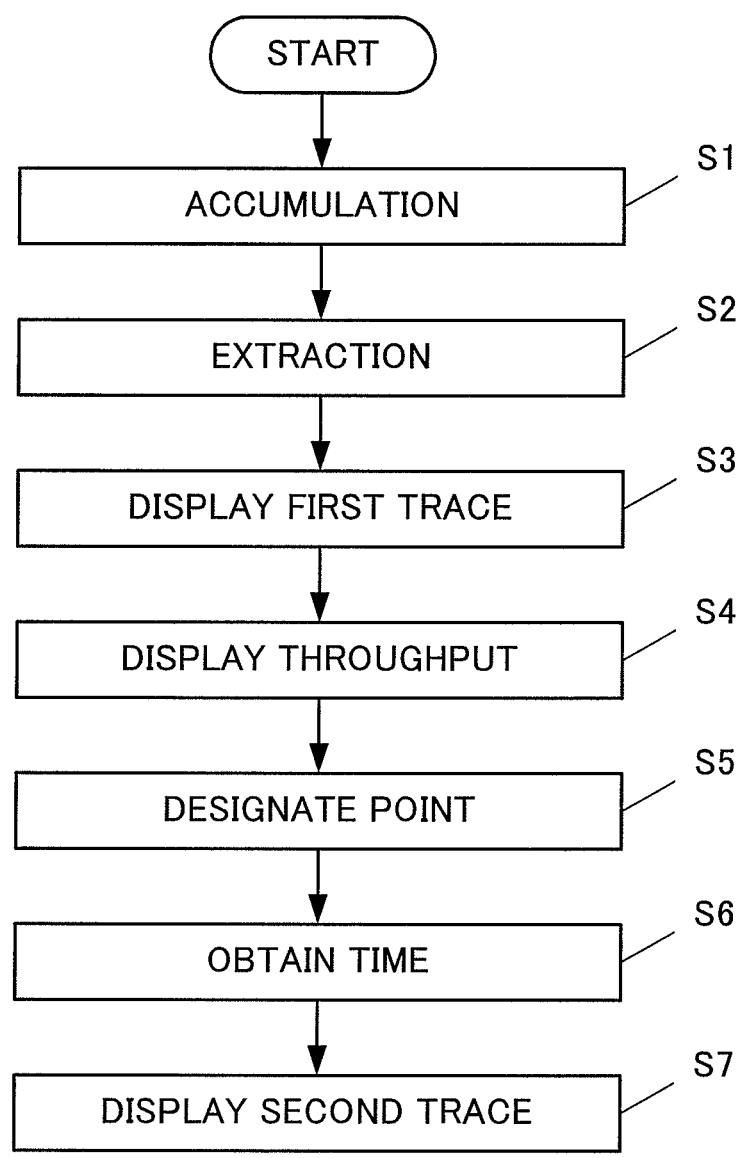
FIG. 11 is a flow chart of a communication test device and a communication test method of associating and displaying throughput data with trace data.
Figure 12:
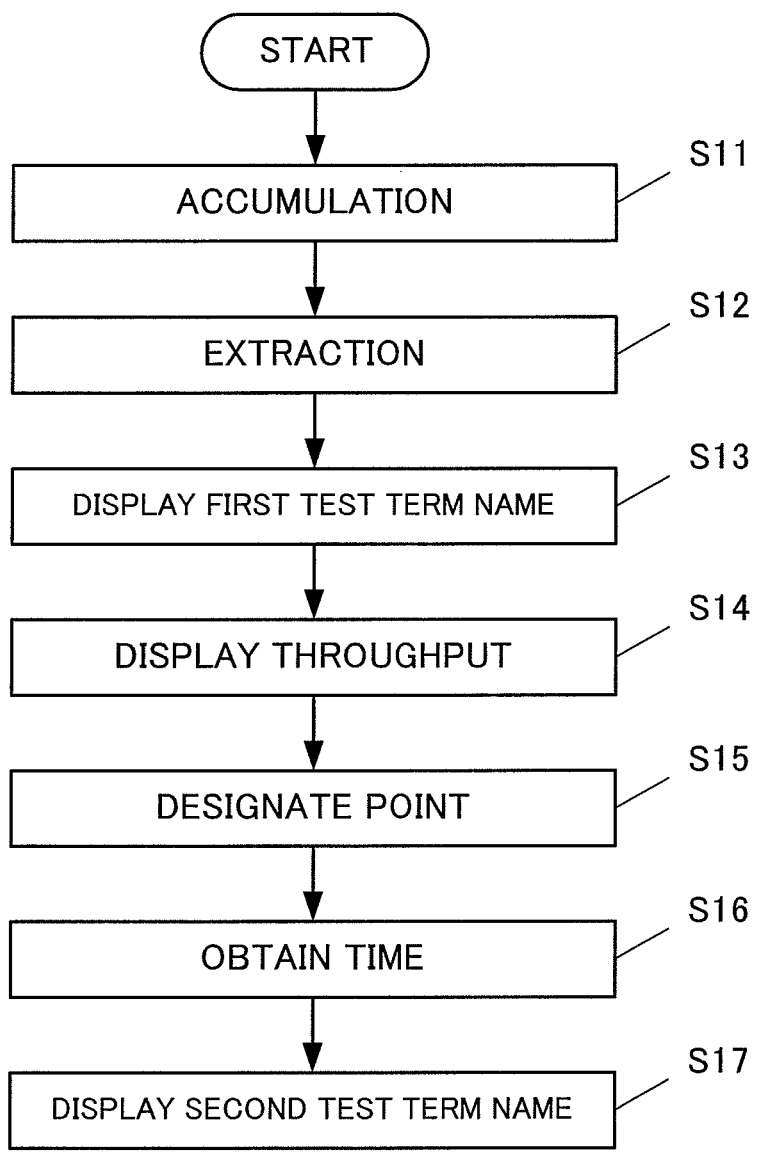
FIG. 12 is a flow chart of a communication test device and a communication test method of associating and displaying throughput data with test term name.

The communication test method of associating and displaying throughput data with trace data, according to the tenth embodiment of the present invention, will be described hereinafter with reference to FIG. 11.

Firstly, the trace data information generating means 12 accumulates trace data on a specific unit of data to be exchanged between the mobile communication terminal 2 and the base station unit 11 and throughput data regarding throughput for the specific unit of data in association with time information indicative of the time of sending and receiving the specific unit of data in the accumulating means 15 (in step S1).

Then, the extracting means 21 extracts trace data and throughput data from the accumulating means 15 (in step S2). The trace display means 24 and the throughput display means 22 displays the trace data extracted by the extracting means 21 and a graph 3 showing the variation with time of throughput based the throughput data extracted by the extracting means 21 on the display unit 25 (in steps S3 and S4).

When the operating unit 26 designates at least one point selected for a designated analysis from an area on the graph 3 (in step S5), the time obtaining means 27 obtains a time corresponding to the designated point (in step S6). The extracting means 21 extracts, from the accumulating means 15, trace data corresponding to the time obtained by the time obtaining means 27, the trace data extracted by the extracting means 21 is displayed on the display unit 25 in a way that the trace data extracted by the extracting means 21 is distinguished from other trace data on the display unit 25 (in step S7). In this step, the trace data may be displayed on the display unit 25 with detail information on the relevant trace data.

Figure 8:
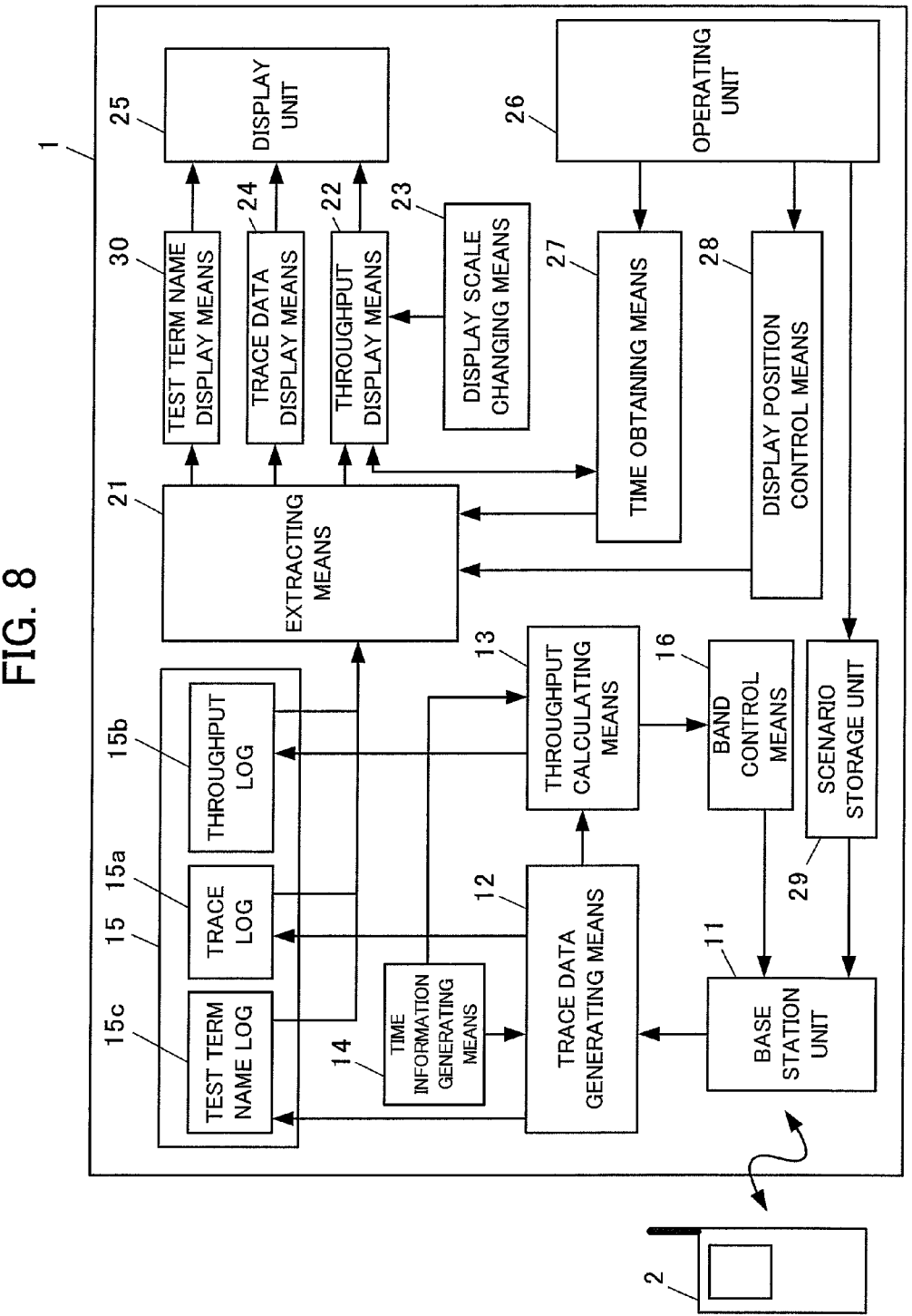
FIG. 8 is a block diagram showing the construction of the communication test device according to another embodiment of the present invention, the communication test device being adapted to associate and display throughput with test term name.

FIG. 8 is a block diagram showing the construction of the communication test device according to the embodiment of the present invention. The embodiment of a communication test device according to the present invention will be described hereinafter with FIG. 8. The communication test device is adapted to associate throughput with test term name data, and to display the throughput and the trace data. The communication test device 1 shown in FIG. 8 is adapted to test a mobile communication terminal 2 by functioning as a base station of a mobile communication system to perform wireless communication with the mobile communication terminal 2 on the basis of designated communication standard. The communication test device 1 has, for example, a function to test throughput indicative of amount of data transmitted to and received from the mobile communication terminal 2 in format and unit based on the communication standard.

The communication test device 1 comprises a base station unit 11, trace data information generating means 12, throughput calculating means 13, time information generating means 14, accumulating means 15, band control means 16, extracting means 21, throughput display means 22, display scale changing means 23, trace display means 24, a display unit 25, an operating unit 26, time obtaining means 27, a display position control means 28, scenario storage unit 29, and test term name display means 30.

The communication test device 1 is constituted by a central processing unit (CPU), memory media and the like. The memory media is constituted by random access memory (RAM), read only memory (ROM), hard disc drive, and the like. The above-mentioned means may be constituted by electronic circuits in place of program modules to be executed by the CPU.

The base station unit 11 is adapted to simulate and function as a base station of a mobile communication system, and to perform wireless communication with the mobile communication terminal 2 on the basis of designated communication standard.

For example, the wideband code division multiple access (W-CDMA), the global system for mobile (GSM) or the like is employed as the designated communication standard. Further, the high speed downlink packet access (HSDPA) defined by the 3rd generation partnership Project (3GPP) as high-speed packet communication standard derived from the wideband code division multiple access (W-CDMA), or the like may be employed as the designated communication standard.

The wireless communication between the base station unit 11 and the mobile communication terminal 2 is performed on the basis of a scenario defining a communication procedure. The scenario storage unit 29 has a plurality of scenarios having test term names for identifying tests to be executed on the basis of the communication procedures.

When, for example, a scenario's name included in a list (not shown) is designated by the operating unit 26, a scenario corresponding to the designated scenario's name is determined as a scenario to be executed by the base station unit 11. FIG. 9 is an image displayed on the display unit 25 in the form of a window, the image having various kinds of data. One or more scenarios to be executed by the base station unit 11 are displayed in the display area 31.

The following description is directed to a method of designating scenarios to be executed by the base station unit 11. When a scenario is executed and finished, a scenario next to the finished scenario may be designated by the user. After a sequence of scenarios is determined, the scenarios may be executed in the sequence.

As shown in FIG. 9, scenarios "Voice_test", "Packet_test", "Video_test", "Packet_Ratechange_test", and "PPP_test" listed in a designated sequence in a display area 31 are executed in a designated sequence. As an example, each of the scenarios "Voice_test", "Packet_test", "Video_test", "Packet_Ratechange_test", and "PPP_test" listed in a display area 31 may be displayed in a designated sequence after being executed in the designated sequence.

FIG. 10 shows parts of the scenarios "Voice_test", "Packet_Ratechange_test", and "PPP_test". As will be seen from FIG. 10, the scenario "Packet_Ratechange_test" has character string information indicative of a test term name, and flags "Start_sequence" and "End_sequence" indicating a start and an ending of the test term. Here, the scenario may have only a flag indicating a start, and may not have a flag indicating an ending. As shown in FIG. 9, the test term names "Rate_64K" and "Rate_384K" are displayed in the display area 31. In order to indicate that the scenario "Packet_Ratechange_test" has test term names, the test term names may be indented.

When the communication test device starts the designated scenario, the base station unit 11 is adapted to inform the trace data information generating means 12 of the designated scenario's name as a test term name. Further, the base station unit 11 is adapted to inform the trace data information generating means 12 of the character string information indicative of a test term name and a start of a test term on the basis of a flag indicating a start of a test term described in the scenario. Further, the base station unit 11 is adapted to inform the trace data information generating means 12 of the character string information indicative of a test term name and an ending of the test term on the basis of a flag indicating an ending of a test term described in the scenario. When the scenario has a flag indicating a start and a flag indicating an ending time, the ending time of the test is obtained from the start of the test term, the communication test device can clearly indicate not only a start of a test term but also a period in which the test term has been executed, in comparison with a scenario having only a flag indicating a start.

The trace data information generating means 12 is adapted to obtain, from the base station unit 11, specific units of data transmitted to the mobile communication terminal 2 and specific units of data received from the mobile communication terminal 2, to extract, from the specific units of data received from the base station unit 11, information on event numbers, state of sequence in each layer, primitive parameters, message, time and like, to generate trace data having the extracted information and time information, and to output the trace data to the accumulating means 15. In response to the test term name received from the base station unit 11, the trace data information generating means 12 is adapted to generate test term name data 15c from the extracted information and time information, and to output the term name data 15c to the accumulating means 15. Further, the trace data information generating means 12 is adapted to output, to the throughput calculating means 13, specific units of data transmitted to the mobile communication terminal 2 and specific units of data received from the mobile communication terminal 2.

The throughput calculating means 13 is adapted to calculate throughput per channel and session, and per unit of time, to generate throughput data from the calculated throughput with time information, and to output the throughput data to the accumulating means 15. Further, the throughput calculating means 13 is adapted to output the throughput data to the band control means 16. Here, the channel and session include logical channel, transport channel, physical channel, network service access point identifier (NSAPI), and the like.

Here, the term "throughput" is intended to indicate an effective speed of data other than overhead in each layer if the user does not designates the throughput.

The time information generating means 14 is adapted to output time information to the trace data information generating means 12 and the throughput calculating means 13 at regular intervals.

The accumulating means 15 is adapted to accumulate, as trace log 15a in a storage medium, trace data outputted from the trace data information generating means 12, and adapted to accumulate, as throughput log 15b in the storage medium, throughput data outputted from the throughput calculating means 13.

The band control means 16 is adapted to control communication band by negotiating (and setting) the communication band with the mobile communication terminal 2 on the basis of the throughput data outputted from the throughput calculating means 13 in accordance with procedure based on the standard for communication with the mobile communication terminal 2.

The extracting means 21 is adapted to extract throughput data from the accumulating means 15, and adapted to output the extracted throughput to the throughput display means 22. Further, the extracting means 21 is adapted to extract test item name from the accumulating means 15, and adapted to output the extracted test item name to the trace display means 24. Further, the extracting means 21 is adapted to extract trace data from the accumulating means 15, and adapted to output the extracted trace data to the trace display means 24.

The throughput display means 22 is adapted to display, on the display unit 25, a graph 3 showing the variation with time of throughput based the throughput data extracted by the extracting means 21. For example, the graph 3 shows the variation with time of throughput displayed on the display unit 25.

FIG. 9 is an image displayed on the display unit 25 in the form of a window, the image having various kinds of data. The graph 3 has a horizontal axis defined as a time axis and a vertical axis defined as a throughput axis, and shows the variation with time of throughput [kbit/sec].

In response to an input from the user on update intervals of the graph 3, the display scale changing means 23 is adapted to instruct the throughput display means 22 to update the graph 3 at intervals designated by the user. Additionally, the throughput display means 22 may be adapted to scroll the variation with time of throughput at intervals to display a graph 3 showing the current variation with time of throughput.

The trace display means 24 is adapted to update the trace data displayed on the display unit 25 to the latest trace data extracted by the extracting means 21. For example, FIG. 9 is an image to be displayed on the display unit 25, the image having a graph 3 showing the latest trace data, and a display area 4 having information corresponding to event numbers, a state of sequence in each layer, primitive parameters, message, time and like.

The test term name display means 30 is adapted to display, in a display area 31 of the display unit 25, a test term name based on the test term name data extracted by the extracting means 21 as needed.

The display unit 25 is constituted by a liquid crystal display or the like, and adapted to display an image shown in FIG. 9.

The operating unit 26 is constituted by a plurality of operation buttons, and adapted to input information received from the user when the operating unit 26 is operated by the user.

When the user designates a time for identifying detail information on the basis of the variation with time of throughput displayed on the display unit 25 by using the operating unit 26, the time obtaining means 27 is adapted to obtain the time designated by the user, and adapted to output the time to the extracting means 21.

When, for example, the user scrolls the graph 3 shown in FIG. 2 or/and moves a scroll bar of the display area 4 by using the operating unit 26, the display position control means 28 is adapted to have the extracting means 21 extract throughput data and trace data in response to an action of the scroll bar.

When the extracting means 21 extracts throughput data, trace data, and test term name data from the accumulating means 15, the extracting means 21 outputs the throughput data, trace data, and test term name data extracted from the accumulating means 15 to the throughput display means 22, the trace display means 24, and the test term name display means 30. On the other hand, the throughput display means 22, the trace display means 24, and the test term name display means 30 the throughput data, the trace data, and the test term name data on the display unit 25, respectively.

The extracting means 21 is adapted to extract, from the accumulating means 15, trace data corresponding to time obtained by the time obtaining means 27, and adapted to output the extracted trace data to the trace display means 24. On the other hand, the trace display means 24 is adapted to display the trace data on the display unit 25.

The extracting means 21 is adapted to extract, from the accumulating means 15, test term name data corresponding to time obtained by the time obtaining means 27, and adapted to output the extracted test term name data to the trace display means 24. On the other hand, the trace display means 24 is adapted to display the test term name on the display unit 25.

The operation of the communication test device according to the present invention will then be described hereinafter with reference to accompanying drawings.

Eleventh Embodiment

In order to check the details of the graph 3 displayed on the display unit 25, the user moves a marker 5 to a point on the graph 3 displayed on the display unit 25 by using the operating unit 26. The time obtaining means 27 obtains a time corresponding to the point designated by the marker 5, and outputs the time to the extracting means 21. Here, the user may designate a time by inputting a value indicative of the time through the operating unit 26 without using the marker 5.

Then, the extracting means 21 extracts, from the accumulating means 15, trace data and test term name corresponding to the time outputted from the time obtaining means 27. Here, the extracting means 21 may extract trace data corresponding to the closest time to the time outputted from the time obtaining means 27, or the trace data corresponding to a time immediately preceding the time outputted from the time obtaining means 27.

The extracting means 21 may extract a test term name of a test executed at a time immediately preceding the time outputted from the time obtaining means 27 if there is no data regarding the ending time of the test executed at the time outputted from the time obtaining means 27.

The extracting means 21 outputs the extracted trace data to the trace display means 24, while the trace display means 24 displays the trace data in a way that the trace data outputted by the extracting means 21 is distinguished from other trace data on the display unit 25. The extracting means 21 outputs the extracted test term name to the test term name display means 30, while the test term name display means 30 displays the test term name in a way that the test term name outputted by the extracting means 21 is distinguished from other test term names on the display unit 25.

When, for example, the trace data outputted by the extracting means 21 is out of the display area 4 related to the trace data, the trace display means 24 may display the trace data in a way that the trace data outputted by the extracting means 21 falls within the display area 4, or may highlight the trace data.

When, for example, the test term name outputted by the extracting means 21 is out of the display area 31 related to the test term name, the trace display means 24 may display the test term name in a way that the test term name outputted by the extracting means 21 falls within the display area 31, or may highlight the test term name.

From the foregoing description, it will be understood that the communication test device according to the eleventh embodiment of the present invention can assist in identifying a cause of the change in throughput of the mobile communication terminal 2 under test, and can identify the relation of the executed test to the throughput of the mobile communication terminal 2 under test, by reason that, when a user designates a time on the basis of the variation with time of throughput displayed on the display unit 25, the extracting means 21 extracts trace data corresponding to the designated time, the trace display means 24 displays the extracted trace data on the display unit 25 in a way that the trace data corresponding to the time obtained by the time obtaining means 27 is distinguished from other trace data on the display unit 25, when the communication test device 2 executes a test based on a designated communication procedure while changing parameters related to transmission power, wireless communication band, and the like, the scenario having character string information indicative of a test term name corresponding to the changed parameter, the extracting means 21 extracts, from the accumulating means 15, a test term name of a test executed at the time obtained by the time obtaining means 27, and the test term name display means 30 displays the test term name of the test executed at the time obtained by the time obtaining means 27 on the display unit 25 in a way that the test term name of the test executed at the time obtained by the time obtaining means 27 is distinguished from other test term name on the display unit 25.

The communication test method of associating and displaying throughput data with trace data, according to the eleventh embodiment of the present invention, will be described hereinafter with reference to FIG. 11.

In this method, the scenario storage unit 29 has a plurality of scenarios defining communication procedures for wireless communication with a mobile communication terminal 2 under test, and the scenarios has test term names for identifying tests to be executed on the basis of the communication procedures.

The trace data information generating means 12 accumulates trace data regarding a specific unit of data to be exchanged between the mobile communication terminal 2 and the base station unit 11 and throughput data regarding throughput for the specific unit of data in association with time information indicative of the time of sending and receiving the specific unit of data in the accumulating means 15 (in step S11).

Then, the extracting means 21 extracts throughput data from the accumulating means 15 (in step S12). The test term name display means 30, the throughput display means 22 and the trace display means 24 display the extracted test term name, the trace data extracted by the extracting means 21 and a graph 3 showing the variation with time of throughput based the throughput data extracted by the extracting means 21 on the display unit 25 (in steps S13 and S14).

When the operating unit 26 designates at least one point selected for a designated analysis from an area on the graph 3 (in step S15), the time obtaining means 27 obtains a time corresponding to the designated point (in step S16). The extracting means 21 extracts, from the accumulating means 15, a test term name of a test executed at the time obtained by the time obtaining means 27, the test term name extracted by the extracting means 21 is displayed on the display unit 25 in a way that the test term name extracted by the extracting means 21 is distinguished from other test term names on the display unit 25 (in step S17).

In this specification, the first to eleventh embodiments of the communication test device according to the present invention have been described, may be combined and defined as an embodiment, or may be selectively combined and defined as an embodiment.

INDUSTRIAL APPLICABILITY

As will be seen from the foregoing description, the communication test device according to the present invention has an advantageous effect of assisting in identifying a cause of the change in throughput of a mobile communication terminal under test, and is useful as a communication test device for monitoring data transmitted and received from the a wireless communication device.

The invention claimed is:

1. A communication test device, comprising:
a base station unit for performing wireless communication with a mobile communication terminal under test on the basis of a designated communication standard;
accumulating means for accumulating trace data regarding a specific unit of data to be exchanged between said mobile communication terminal and said base station unit and throughput data regarding throughput for said specific unit of data in association with time information indicative of the time of sending and receiving said specific unit of data;
extracting means for extracting said trace data and said throughput data from said accumulating means;
a display unit on which said trace data extracted by said extracting means are displayed by trace display means, and a graph showing the variation with time of throughput based said throughput data extracted by said extracting means is displayed by throughput display means; and
time obtaining means for obtaining a time corresponding to at least one point on said graph selected for a designated analysis within said graph, wherein
said extracting means extracts, from said accumulating means, said trace data corresponding to said time information relating to said time obtained by said time obtaining means, and
said trace display means displays said trace data corresponding to said time obtained by said time obtaining means on said display unit in a way that said trace data corresponding to said time obtained by said time obtaining means is distinguished from other trace data on said display unit, wherein
said throughput display means displays a graph showing individually the variation with time of throughput based on said designated communication standard and the variation with time of throughput based on other communication standard in response to the variation of said wireless communication based on said designated communication standard to said wireless communication based on other communication standard.

2. A communication test device according to claim 1, wherein
said throughput display means further scrolls a graph showing the variation with time of throughput based said throughput data extracted by said extracting means, and stops scrolling said graph when said time obtaining means obtains a time designated by said operating unit.

3. A communication test device according to claim 1, wherein said trace display means displays trace data on said display unit with detail information on the relevant trace data.

4. A communication test device according to claim 1, wherein
said time obtaining means obtains two or more times designated by said operating unit on the basis of the variation with time of throughput displayed on said display unit,
said extracting means extracts, from said accumulating means, said trace data corresponding to said times obtained by said time obtaining means, and
said trace display means displays trace data associated with the closest times to said times obtained by said time obtaining means on said display unit in a way that trace data associated with the closest times to said times obtained by said time obtaining means are distinguished from other trace data on said display unit.

5. A communication test device according to claim 4, wherein said trace display means displays trace data on said display unit with detail information on the relevant trace data.

6. A communication test device according to claim 1, wherein
said throughput display means further displays, on said display unit, a graph showing the variation with time of throughput based on said throughput data extracted by said extracting means, and
said graph further shows at least one of an uplink communication band and a downlink communication band decided on the basis of the negotiation with said mobile communication terminal.

7. A communication test device according to claim 6, wherein said trace display means displays trace data on said display unit with detail information on the relevant trace data.

8. A communication test device according to claim 1, wherein
said specific unit of data received from said mobile communication terminal has an index value indicative of the quality in state of said wireless communication with said mobile communication terminal, and
said graph further shows said index value extracted from the specific unit of data received just before the time obtained by said time obtaining means.

9. A communication test device according to claim 8, wherein said trace display means displays trace data on said display unit with detail information on the relevant trace data.

10. A communication test device according to claim 1, wherein said trace display means displays trace data on said display unit with detail information on the relevant trace data.

11. A communication test device according to claim 1, wherein
said throughput display means further displays a graph showing the variation with time of throughput based said throughput data extracted by said extracting means in a way that the throughput smaller than a predetermined threshold value is distinguished from other throughput on said display unit.

12. A communication test device according to claim 11, wherein said trace display means displays trace data on said display unit with detail information on the relevant trace data.

13. A communication test device according to claim 1, wherein
when a protocol corresponding to a designated layer to be used on the basis of said designated communication standard is selected by said operating unit, said throughput display means displays a graph showing the variation with time of throughput on the basis of said protocol of said designated layer.

14. A communication test device according to claim 13, wherein said trace display means displays trace data on said display unit with detail information on the relevant trace data.

* * * * *